Jan. 29, 1957  F. W. HOELTJE  2,779,435
CENTRIFUGAL BREATHER
Filed April 25, 1955  2 Sheets-Sheet 1
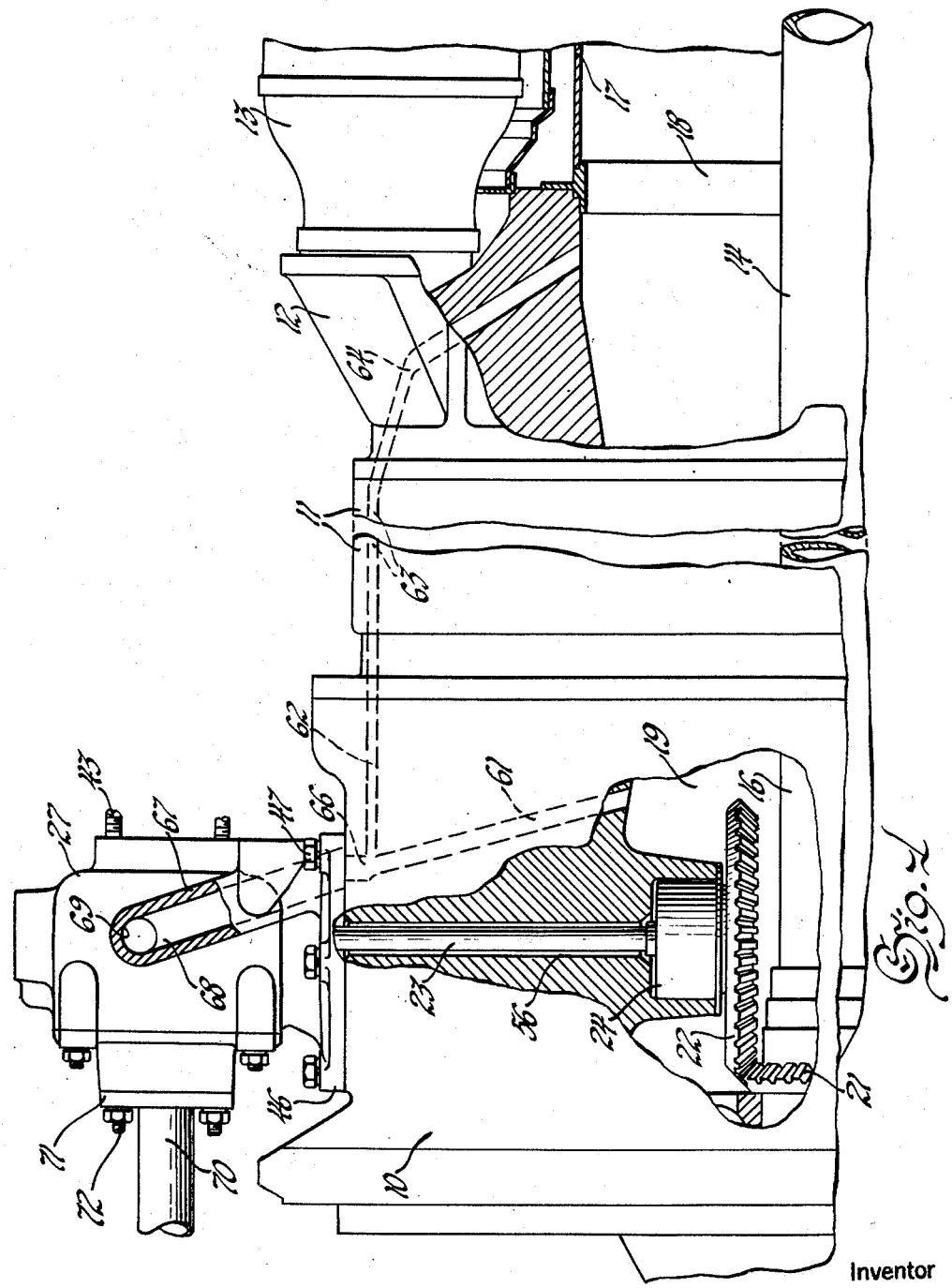
Inventor
FREDERICK W. HOELTJE
By Paul Fitzpatrick
Attorney Jan. 29, 1957   F. W. HOELTJE   2,779,435
CENTRIFUGAL BREATHER
Filed April 25, 1955   2 Sheets-Sheet 2
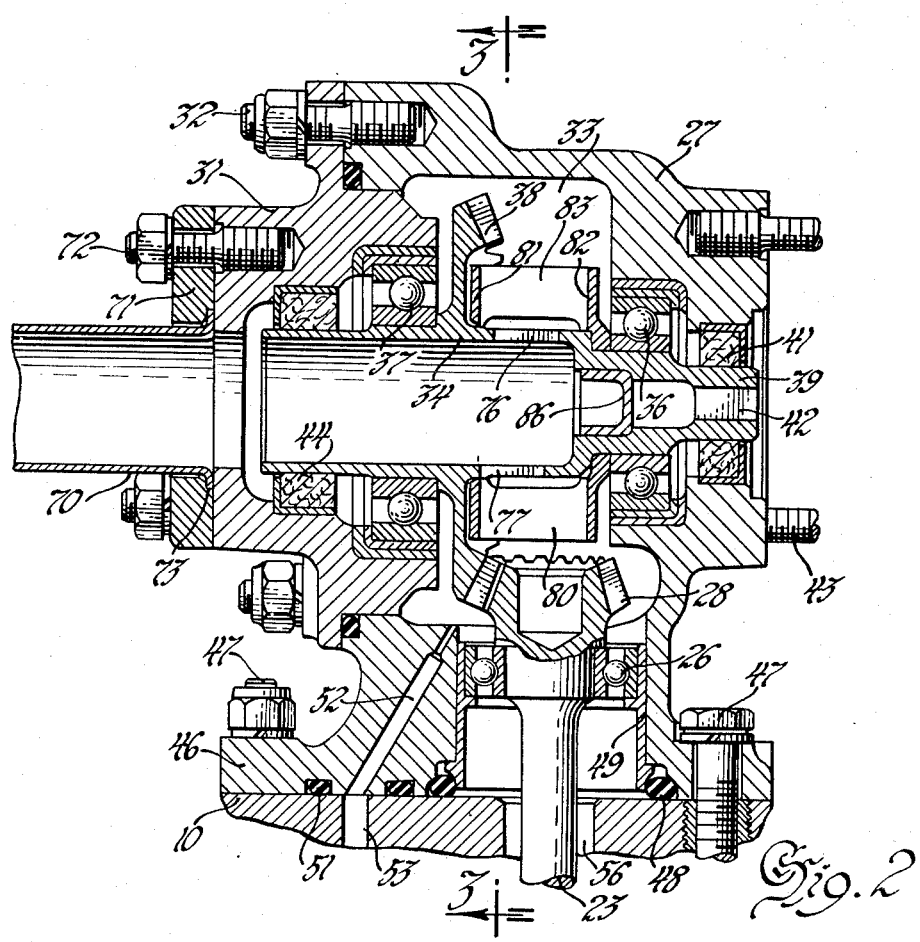
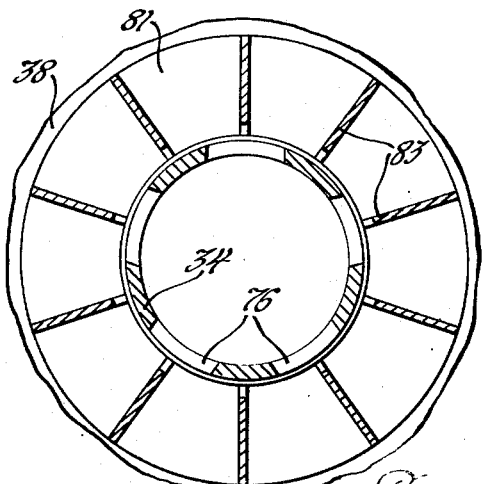
Inventor
FREDERICK W. HOELTJE
By Paul Fitzpatrick
Attorney United States Patent Office 2,779,435
Patented Jan. 29, 1957

2,779,435

CENTRIFUGAL BREATHER

Frederick W. Hoeltje, Indianapolis, Ind., assignor to General Motors Corporation, Detroit, Mich., a corporation of Delaware Application April 25, 1955, Serial No. 503,396

2 Claims. (Cl. 183—77)

My invention relates to an oil separating device for the overboard air vent lines or breather pipes of engines, particularly such as aircraft gas turbine engines. These engines ordinarily have enclosed cavities around the main shaft of the engine within which the main shaft bearings are located; that is, the bearings for the compressor and a bearing ahead of the turbine. Oil is discharged onto the bearings, and some air leaks into these cavities from the compressor of the engine, so that this air must be vented overboard to prevent a rapid build-up of pressure in the interior of the engine. The oil is discharged from these cavities, ordinarily through scavenge pumps. Some air may be discharged by these pumps, but usually there is a surplus of air, with which oil has become mixed in the form of a mist or fog by the rapidly rotating shafting and bearings of the engine, which must be vented.

Common practice hitherto has been simply to discharge this oil-laden air overboard from the airplane. The present invention is directed to the provision of a compact and simple oil separator which can be readily incorporated in an engine, without significant complexity or weight penalties, and which will serve to remove most of the oil from the air and return it to the engine. Significant economies of oil may be obtained by virtue of the invention.

In the preferred embodiment of the invention the separation is accomplished by a small centrifugal impeller, similar to a small centrifugal fan, which is driven by the engine and through which the vented air flows in a radially inward direction, the fan acting as an oil slinger but permitting the air to flow through against the slight pressure head of the fan.

The principal object of the invention is to improve the oil economy of gas turbine engines. Another object is to clean the oil from the air vented overboard. A further object is to provide an oil separator of light weight and compact construction.

The nature of the invention and the advantages thereof will be clear to those skilled in the art from the succeeding detailed description of an installation incorporating the preferred embodiment of the invention and the accompanying drawings thereof in which:

Figure 1 is a partial view of an aircraft gas turbine engine of known type with the centrifugal breather of the invention incorporated therein, parts being cut away and shown in section;

Figure 2 is a vertical sectional view through the breather device taken on a plane extending lengthwise of the engine; and Figure 3 is a cross section of the impeller taken on the plane indicated in Figure 2.

Referring first to Figure 1, there is shown in that view the parts of an axial-flow gas turbine engine essential to an understanding of this invention. The engine includes a forward frame 10, an axial-flow compressor 11, a midframe or diffuser 12, combustion apparatus 13, shown partially, and a turbine (not shown) which drives the main shaft 14 of the engine. The main shaft drives the compressor 11, the details of which are not shown. A shaft 16 extends from the compressor into the forward frame 10 where it is supported for rotation. The forward frame also defines the inlet to the compressor, as is well known. The diffuser 12 conducts the air from the compressor to the combustion apparatus. A shroud 17 defines a cavity 18 within the engine between the compressor and turbine which ordinarily receives air leaking through the compressor ring seals and oil from the rear compressor and front turbine bearings. The forward frame defines a cavity 19, which may also receive leakage air in some engines.

A bevel gear 21 on shaft 16 drives bevel gear 22 on radial accessory drive shaft 23 supported in a bearing 24 in the forward frame 10. As shown in Figure 2, the upper end of shaft 23 is supported in a bearing 26 in a housing 27 and mounts a bevel gear 28 in the housing. Shaft 23 extends through a strut bridging the annular air inlet.

The housing 27 might include gearing for driving of one or more engine accessories or auxiliaries. In this particular case, housing 27 provides a mounting pad and drive shaft for an engine tachometer. Body 27, with a front cover 31 fixed thereto by studs and nuts 32, defines a chamber 33. A tachometer drive shaft or sleeve 34 extending through the chamber 33 is journaled for rotation in bearings 36 and 37 mounted in the body and front cover, respectively. Shaft 34 is integral with a bevel gear 38 which meshes with bevel gear 28 so that shaft 34 is rotated by the engine shaft 16 through the two sets of bevel gears and shaft 23.

The reduced rear end portion 39 of shaft 34 rotates in an oil seal 41 and is formed with a square or other suitable socket 42 to receive the drive shaft of a tachometer (not shown) mounted on the rear face of the body 27 by studs 43. The front end of shaft 34 rotates in an oil seal 44 in the cover 31. The housing 27 comprises a flange 46 at the bottom thereof which is fixed by studs or bolts 47 to a pad on the top of the inlet housing 10. An O-ring seal 48 is mounted in an annular groove between the retainer 49 for bearing 26 and the flange 46. Another O-ring 51 is mounted in a circumferential groove around a lubricating oil passage 52, communicating with a passage 53 in the frame 10, through which oil is discharged at the meshing gears 28 and 38. Oil slung by these gears serves to lubricate bearings 36, 37, and 26, and may drain back into the engine through the annular passage 56 between shaft 23 and the body of housing 10. The structure so far described is such as would be provided for the tachometer drive and, of course, similar structure might be used for various accessory drive purposes.

Considering now the breather arrangements of the invention, a generally radial breather passage 61 extends from the cavity 19 in the forward frame and a second passage 62 extends from the rear face of the forward frame to join the passage 61. A passage 63 extending longitudinally of the compressor case 11 which may be cored in the wall of the case, provides connection with a passage or conduit 64 in the midframe or diffuser 12 which extends to the main engine cavity 18. As will be seen, therefore, the cavities 18 and 19 are connected through these passages to a common discharge conduit 66 extending through the upper face of the inlet case 10 below the body 27. The near side of the body 27 in Figure 1 has a rib 67 thereon which is bored or cored to provide a conduit 68 extending from the lower face of flange 46, where it communicates with conduit 66, to an inlet 69 which extends radially into the radially outer part of chamber 33 in body 27. Thus, oil-laden air vented from the interior of the engine enters the outer part of chamber 33 and, of course, oil from the oil jet 52 also enters this chamber where it may be nebulized by gears 28 and 38. This air is discharged overboard from the aircraft through a vent pipe 70 fixed to the forward face of front cover 31 by any suitable coupling such as ring 71 held by studs and nuts 72 and engaging a flange 73 of the vent pipe.

Two staggered rows of holes are drilled through the shaft 34 within chamber 33, there being preferably five holes 76 in the rear row and five holes 77 in the forward row. Through these holes, air can flow from the outer part of chamber 33 to the inner part of the chamber within the hollow shaft 34 and then flow forwardly of the shaft into the overboard vent pipe 70. This air, however, must flow through a centrifugal impeller 80 on shaft 34. This impeller comprises a forward ring 81, a rear ring 82, and radial blades 83 extending between the rings. The impeller may be of brazed construction and be brazed to the shaft.

A pressed plug 86 closes off the tachometer connection from the air flowing into vent pipe 70.

It is believed the operation of the device will be apparent from the foregoing, but it may be reviewed briefly. Air passing the engine seals flows from chamber 18 through conduits 64, 63 and 62, and from chamber 19 through conduit 61, into the common conduit 66 through which it is discharged into the passage 68, 69 of the oil separator which discharges into the peripheral part of chamber 33, which chamber is of generally cylindrical shape. When the engine is operating, engine shaft 16 drives through gears 21, 22, shaft 23, and gear 28 to drive gear 38 on shaft 34 with which the impeller 80 is integral. This impeller develops a slight pressure, acting as a centrifugal fan, which maintains a pressure in the interior of the engine slightly above atmospheric. As will be apparent, the air can readily flow from the engine inwardly through the centrifugal fan because the pressure differential across the seals in the engine is ordinarily quite high since engine compression ratios usually are of the order of ten to one. Particles of oil mist, however, flowing into the impeller will be impinged by the blades 83 of the impeller. The impeller blades are moving at a high velocity transverse to the inward direction of flow of the stream and the oil particles do not readily change direction. Oil thus impinging upon the blades will remain thereon and be flung outwardly off the blades by centrifugal force against the wall of chamber 33. This oil will drain to the lower part of the chamber and flow into the engine. The oil may flow through bearing 26 and passage 56 into the engine or, if desired, a separate oil drain passage may be provided. The provision of the separator involves a very slight alteration of the engine, since, without the separator, it is customary to provide an overboard vent connection from the engine. Merely by adding the centrifugal impeller and connecting the vent pipe so the air flows through the impeller the oil separation is achieved.

The simplicity and utility of the structure will be readily apparent. Because of its compactness and light weight it does not penalize the engine with bulk or weight which are difficult to justify in aircraft installations.

The detailed description herein of the preferred embodiment of the invention for the purpose of explaining the principles thereof is not to be regarded as limiting the invention, since various modifications of structure may be devised by the exercise of skill in the art within the scope of the invention.

I claim:

1. A device adapted for separation of oil from air vented from an engine case comprising, in combination, a body defining a chamber; a centrifugal impeller rotatably mounted in the body and having a peripheral inlet, a central outlet, and blades extending radially between the inlet and outlet, the impeller dividing the chamber into an inlet chamber radially outward of the impeller and an outlet chamber radially inward of the impeller; means for rotating the impeller; conduit means entering the inlet chamber adapted to connect the inlet chamber to an engine case to receive oil-laden air therefrom; a vent conduit communicating with the said radially inward outlet chamber for discharging air therefrom; and means defining an oil drain passage from the lower part of the inlet chamber.

2. A device adapted for separation of oil from air vented from an engine having a case comprising, in combination, a body defining a chamber; a centrifugal impeller rotatably mounted in the body and having a peripheral inlet, a central outlet, and blades extending radially between the inlet and outlet, the impeller dividing the chamber into an inlet chamber radially outward of the impeller and an outlet chamber radially inward of the impeller; means for rotating the impeller; conduit means entering the inlet chamber connecting the inlet chamber to the engine case to receive oil-laden air therefrom; a vent conduit communicating with the said radially inward outlet chamber for discharging air therefrom; and means defining an oil drain passage from the lower part of the inlet chamber.

References Cited in the file of this patent

UNITED STATES PATENTS

| | | |
|---|---|---|
| 1,441,638 | Slater | Jan. 9, 1923 |
| 1,471,565 | Milton | Oct. 23, 1923 |
| 1,741,774 | Houghton | Dec. 31, 1929 |
| 2,034,323 | Bernard | Mar. 17, 1936 |
| 2,172,729 | Chilton | Sept. 12, 1939 |
| 2,364,279 | Dodge | Dec. 5, 1944 |